(12) United States Patent
Ohtake et al.

(10) Patent No.: US 6,593,000 B2
(45) Date of Patent: Jul. 15, 2003

(54) CHEMICALLY ADSORBED FILM AND METHOD OF MANUFACTURING THE SAME

(75) Inventors: Tadashi Ohtake, Neyagawa (JP); Norihisa Mino, Settu (JP); Kazufumi Ogawa, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/058,220

(22) Filed: Jan. 29, 2002

(65) Prior Publication Data

US 2002/0094436 A1 Jul. 18, 2002

Related U.S. Application Data

(63) Continuation of application No. 09/892,530, filed on Jun. 28, 2001, now Pat. No. 6,410,152, which is a division of application No. 08/306,517, filed on Sep. 15, 1997, now Pat. No. 6,277,444, which is a continuation of application No. 08/021,120, filed on Feb. 23, 1993, now abandoned.

(30) Foreign Application Priority Data

Mar. 2, 1992 (JP) ............................................. 4-044289

(51) Int. Cl.[7] ................................................. B32B 9/04
(52) U.S. Cl. ...................................................... 428/447
(58) Field of Search ......................................... 428/447

(56) References Cited

U.S. PATENT DOCUMENTS

| | | | | |
|---|---|---|---|---|
| 3,127,457 A | * | 3/1964 | Pinto | ........................ 249/114.1 |
| 4,539,061 A | | 9/1985 | Sagiv | |
| 5,011,963 A | | 4/1991 | Ogawa et al. | |

FOREIGN PATENT DOCUMENTS

| | | |
|---|---|---|
| DE | 3 701 654 | 7/1987 |
| EP | 0 326 438 A3 | 8/1989 |
| EP | 0 386 784 | 9/1990 |
| EP | 0 437 278 A1 | 7/1991 |
| EP | 0 474 228 A1 | 3/1992 |
| EP | 482613 | * 4/1992 |
| EP | 0 492 417 | 7/1992 |
| EP | 493747 | * 7/1992 |
| EP | 0 499 977 | 8/1992 |
| JP | 02-258886 | * 10/1990 |
| JP | 4-246594 | 9/1992 |

OTHER PUBLICATIONS

Tillman et al. "Formation of Multilayers by Self–Assembly" Langmuir, vol. 5, No. 1, 1989.

Mino et al. Thin Solid Films, 243 (1–2), pp 374–7, 1994.

* cited by examiner

Primary Examiner—Erma Cameron
(74) Attorney, Agent, or Firm—Morrison & Foerster, LLP

(57) ABSTRACT

A highly dense chemically adsorbed film is formed by repeating the alternate process of adsorption reaction and washing. Adsorption reaction is directed by contacting the substrate surface, which has or is given an alkali metal or a functional group, with a chemical adsorbent, having halosilyl or alkoxysilyl groups at the end of molecules. An unreacted chemical adsorbent is then washed away from the substrate surface. The alternate treatment of adsorption reaction and washing is repeated, thereby covalently bonding a chemically adsorbed film to the substrate surface. As a result, a chemically adsorbed film is formed in which stem molecules are directly or indirectly covalently bonded to the substrate surface via at least one element chosen from the group consisting of Si, Ge, Sn, Ti, Zr, S or C and graft molecules are covalently bonded to at least one element chosen from Si, Ge, Sn, Ti, Zr, S or C via at least one bond chosen from —SiO—, —GeO—, SnO—, —TiO—, ZrO—, —SO$_2$—, —SO— and —C—.

12 Claims, 3 Drawing Sheets

CHEMICALLY ADSORBED FILM AND METHOD OF MANUFACTURING THE SAME

This application is a continuation of U.S. Ser. No. 09/892,530, filed Jun. 28, 2001, now U.S. Pat. No. 6,410,152, which is a division of U.S. patent Ser. No. 08/306,517, filed Sep. 15, 1997, now U.S. Pat. No. 6,277,444, which is a continuation of U.S. Ser. No. 08/021,120, filed Feb. 23, 1993, now abandoned.

FIELD OF THE PRESENT INVENTION

The invention relates to a chemically adsorbed film and method of manufacturing the same; more particularly, the invention relates to a chemically adsorbed film and its method of manufacture, in which the molecules are, as a whole, densely connected to the substrate surface by chemically bonding graft molecules to chemically adsorbed stem molecules.

BACKGROUND OF THE INVENTION

Conventional methods used for manufacturing chemically adsorbed film include the procedure mentioned, for example, on page 92, volume 102 of the Journal of American Chemical Society (J. Sagiv et al., Journal of American Chemical Society, 92, 102 (1980)) and page 851 of the sixth volume of Langmuir (K. Ogawa et al., Langmuir, 6, 851 (1990)). In this method, a chemically adsorbed film is manufactured by a dehydrochlorination reaction between groups exposed on a substrate surface, such as dehydroxyl groups, and a chlorosilane-based surface active material. The adsorption reaction is carried out for many hours until it reaches the point of saturation adsorption. To form one chemically adsorbed film, an adsorption reaction, a washing and a rinsing are performed once.

However, the above-noted method is limited in improving film density; the number of functional groups of the group itself sets an upper limit on the site number for the adsorption reaction of chemically adsorbed material. As a result, based on the above-noted method, there is a problem that film density can not be improved even by significantly lengthening the time for adsorption reaction.

The method of building up chemical admolecules on a chemically adsorbed film (U.S. Pat. Nos. 4,673, 4,992,300) is also known as a conventional method. However, it is difficult to increase the density of molecules on the substrate surface using this method.

SUMMARY OF THE INVENTION

An objective of the invention is to provide a chemically adsorbed film with improved film density, while detailing its method of manufacture, thereby solving the above-noted problems.

To accomplish the above objective, the chemically adsorbed film of this invention is formed by a direct or indirect covalent bonding of stem molecules to the substrate surface via at least one element chosen from Si, Ge, Sn, Ti, Zr, S or C. Graft molecules are covalently bonded to at least one element chosen from Si, Ge, Ti, Zr, S or C via at least one bond chosen from —SiO—, —GeO—, —SnO—, TiO—, ZrO—, —SO$_2$—, —SO— and —C—.

In the above-noted composition, it is preferable that direct or indirect covalent bonding between stem molecules and the substrate surface employs at least one bond chosen from the following: —SiO—,—SiN—, —GeO—, —GeN—, —SnO—, —SnN—, —TiO—, —TiN—, —ZrO—and —ZrN—.

In the above-noted composition, it is preferable that a stem or graft molecule contains a hydrocarbon chain, a fluorocarbon chain, an aromatic group or a heterocyclic group.

In the above-noted composition, it is preferable that an unsaturated bond is included in a stem or graft molecule.

In the above-noted composition, it is preferable that a chemically adsorbed film is a monomolecular chemically adsorbed built-up film.

The method of manufacturing a chemically adsorbed film of the invention, which is the method of bonding graft molecules to stem molecules, comprises the following procedures:

(1) directly or indirectly contacting the chemical admolecules, containing functional groups as shown in formula [A] or formula [B] at the end of molecules, with the substrate surface, which either has or is given an active hydrogen or alkali metal on the surface, thereby covalently bonding the chemical admolecules, stem molecules, to the substrate surface by condensation reaction;

removing unreacted chemical admolecules;

reacting the substrate surface with water, thereby substituting the halogen or alkoxyl group, or both, to a hydroxyl group.

Formula [A] is provided as seen below:

—AXm 

where X represents halogen, A represents Si, Ge, Sn, Ti, Zr, S or C, m represents 2 or 3.

Formula [B] is represented by:

—A(Q)m 

where Q represents an alkoxyl group, A represents Si, Ge, Sn, Ti, Zr, S or C, m represents 2 or 3.

The method additionally comprises contacting the substrate surface with chemical admolecules containing at least one functional group at the end of molecules, chosen from formulas [C] through [G], thereby creating a condensation reaction;

removing unreacted chemical admolecules;

reacting the substrate surface with water.

Formula [C] is designated:

—AXn 

where X represents halogen, A represents Si, Ge, Sn, Ti, Zr, S or C, n represents 1, 2 or 3.

Formula [D] is designated:

—A(Q)n 

where Q represents an alkoxyl group, A represents Si, Ge, Sn, Ti, Zr, S or C, n represents 1, 2 or 3.

Formula [E] is designated:

—SO$_2$X 

where X represents halogen.

Formula [F] is represented by:

—SOX 

where X represents halogen.

Formula [G] is denoted by:

>N—CHO or —OCHO

In the above-noted composition, it is preferable that unreacted chemical admolecules are removed by a nonaqueous solution.

In the above-noted composition, it is preferable that either liquid water or steam is used in the process of reacting stem or graft molecules with water.

In the above-noted composition, it is preferable that the chemical adsorbent, which contains trichlorosilane-based ends, is used as stem or graft molecules.

In the above-noted composition, it is preferable that the condensation reaction due to the contact with stem or graft molecules is a dehydrochlorination, alcohol elimination or water elimination reaction.

In the above-noted composition, it is preferable that a hydrocarbon chain, a fluorocarbon chain, an aromatic group or a heterocyclic group is included in stem or graft molecules.

In the above-noted composition, it is preferable that an unsaturated bond is included in stem or graft molecules.

Based on this invention, the density of a chemically adsorbed film is improved by increasing the number of admolecules. More specifically, the number of admolecules can be increased by the rise in the site number, which is promoted by introducing graft molecules to the roots of stem molecules. In addition, it is possible that graft molecules are directly bonded to the substrate.

Based on the preferable composition of the invention, direct or indirect covalent bonding of stem molecules to the substrate surface employs at least one bond chosen from —SiO—, —SiN—, —GeO—, —GeN—, —SnO—, —SnN—, —TiO—, —TiN—, —ZrO— and —ZrN—, thus allowing a molecular adsorption film to become chemically stable.

In a preferable composition of the invention—with an unsaturated bond in the hydrocarbon chain of stem or graft molecules—it is possible to polymerize stem and/or graft molecules or to introduce another molecule after the formation of a chemically adsorbed film. It is preferable that the unsaturated bond is the double bond of carbon—carbon (C=C), the double bond of carbon-nitrogen (C=N), the triple bond of carbon—carbon (C≡C), the triple bond of carbon-nitrogen (C≡N) or the like.

Furthermore, a preferable composition of the invention is a chemically adsorbed film and a monomolecular chemically adsorbed built-up film, whereby a film with increased molecular density is formed.

In the method of manufacturing a chemically adsorbed film of the invention, said film with improved film density efficiently may be formed by increasing the number of admolecules, which is made possible by increasing the site number. Moreover, this method can reduce the reaction time.

According to a preferable composition of the invention, the unreacted chemical admolecules are removed by a nonaqueous solution, and a film with a thickness at an angstrom or nanometer level is uniformly formed over the substrate surface.

In a preferable composition of the invention, stem or graft molecules are reacted with liquid water or steam, a halogen atom can be substituted for a hydroxyl group quite efficiently.

The above-noted method of using the chemical adsorbent with trichlorosilane ends as the stem or graft molecules is quite practical, providing a high adsorption reaction.

A preferable composition of the present invention comprises a condensation reaction due to the contact with stem or graft molecules in a dehydrochlorination, alcohol elimination or water elimination reaction, whereby a high reaction rate is possible.

DETAILED DESCRIPTION OF THE INVENTION

Figure 1:
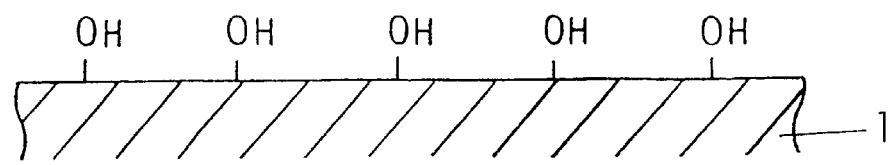
FIG. 1 is a model view, enlarged to a molecular level, showing the substrate of one example according to the invention.

The method of manufacturing a chemically adsorbent film of the invention comprises fixing a chemical adsorbent to a substrate and chemically adsorbed film by repeating the alternate process of adsorption reaction and washing. Particularly, even in case the first adsorption reaction process is not completely directed without reaching the stage of unsaturated adsorption, the number of —OH groups is increased. This result is obtained by removing unreacted molecules with a nonaqueous solvent and by washing the substrate, which has only scattered admolecules on its surface, with water. After the second adsorption reaction, more than two admolecules are found where only one admolecule was originally contained. In this process, the distance between admolecules is decreased mutually and uniformly, thereby increasing the film density.

However, if the time spent for the adsorption reaction is too short, the adsorbed molecules will be scattered over the substrate at wide distances from one another. As a result, the admolecules can bend, become parallel to the substrate, or cover the original sites for adsorption. In order to prevent such undesirable results, more than several minutes are required for the adsorption reaction.

Under standard reaction conditions, however, it is quite likely that the reaction rate is too fast to enable control of the time for adsorption reaction. In this case, the association or collision rates between the reactive groups of the chemical adsorbent and the active hydrogen groups of a substrate can be reduced by lowering the temperature of the reaction or the concentration of adsorbent; as a result, the time for the reaction is extended and thus becomes quite manageable.

In this invention, a chemical adsorbent may be provided as recited below:

a molecule in which a halosilyl group as shown in formula [C] is bonded to the end of molecule—containing a hydrocarbon chain, a fluorocarbon chain, an aromatic ring, a heterocyclic ring, metal or the like;

a molecule in which an alkoxysilyl or aldehydesilyl group as shown in formula [D] is bonded to the end of molecule— containing a hydrocarbon chain, a fluorocarbon chain, an aromatic ring, a heterocyclic ring, metal or the like;

a molecule in which at least one functional group chosen from halogenated sulfonyl groups as shown in formulas [E] and [F] and an aldehyde group as shown in formula [G] is bonded to the end of molecules—containing a hydrocarbon chain, a fluorocarbon chain, an aromatic ring, a heterocyclic ring, metal or the like. However, it is preferable that halosilyl group is either dihalosilyl or trihaloxilyl group. Similarly, alkoxysilyl group should be either dialkoxysilyl or trialkoxysilyl group. In terms of reactivity, Cl is prefered to Br or I as a halogen. However, a similar chemically adsorbed film can be formed even with Br or I.

When the adsorption reaction is carried out more than once, the kind of chemical adsorbent can be changed each time. In spite of the fact that the film density is affected by the change of adsorbent, the density can be controlled in many cases.

The increase or control of film density is applicable not only to the case of forming one film on the substrate but to forming a multilayer film on the existing chemically adsorbed film.

The following can be used as chemical adsorbents in this invention:

(1) trichlorosilane-based surface active materials including $CF_3(CF_2)_7(CH_2)_2SiCl_3$, $CF_3CH_2O\ (CH_2)_{15}SiCl_3$, $CF_3(CH_2)_2Si(CH_3)_2(CH_2)_{15}SiCl_3$, $CF_3(CH_2)_3(CH_2)_2Si(CH_3)_2(CH_2)_9SiCl_3$, $CF_3(CF_2)_7(CH_2)_2Si(CH_3)_2(CH_2)_9SiCl_3$, $CF_3COO(CH_2)_{15}SiCl_3$, or $CF_3(CF_2)_5(CH_2)_2SiCl_3$ (2) monochlorosilane-based surface active materials, whose lower alkyl groups are substituted, or dichlorosilane-based surface active materials including $CF_3(CF_2)_7(CH_2)_2SiCl_n(CH_3)_{3-n}$, $CF_3(CF_2)_7(CH_2)_2SiCl_n(C_2H_5)_{3-n}$, $CF_3CH_2O\ (CH_2)_{15}SiCl_n(CH_3)_{3-n}$, $CF_3CH_2O\ (CH_2)_{15}SiCl_n(C_2H_5)_{3-n}$, $CF_3(CH_2)_2Si(CH_3)_2(CH_2)_{15}SiCl_n(CH_3)_{3-n}$, $CF_3(CH_2)_2Si(CH_3)_2(CH_2)_{15}SiCl_n(C_2H_5)_{3-n}$, $CF_3(CF_2)_7(CH_2)_2Si(CH_3)_2(CH_2)_9SiCl_n(CH_3)_{3-n}$, $CF_3(CF_2)_7(CH_2)_2Si(CH_3)_2(CH_2)_9SiCl_n(C_2H_5)_{3-n}$, $CF_3COO(CH_2)_{15}SiCl_n(CH_3)_{3-n}$, $CF_3COO(CH_2)_{15}SiCl_n(C_2H_5)_{3-n}$, $CF_3(CF_2)_5(CH_2)_2SiCl_n(CH_3)_{3-n}$, or $CF_3(CF_2)_5(CH_2)_2SiCl_n(C_2H_5)_{3-n}$, where n represents 1 or 2.

In particular, trichlorosilane-based surface active materials, in which adjacent molecules form siloxane bonds, are preferable for obtaining a stronger chemically adsorbed film.

Moreover, $CF_3(CF_2)_nCH_2CH_2SiCl_3$ (where n represents an integer, preferably between about 3 and 25) is preferable since it is balanced with the dissolution property, chemical adsorption property, water-and oil-repelling property, and anticontamination property or the like. By incorporating an unsaturated bond into an alkyl or alkyl fluoride chain, a bridge formation can be formed by irradiation with an electron beam at only about 5 Mrads, after formation of a chemically adsorbed film; as a result, the hardness of the film can be improved.

Trichlorosilane-based surface active materials, such as the following: $CH_3(CH_2)_{18}SiCl_3$, $CH_3(CH_2)_{15}SiCl_3$, $CH_3(CH_2)_{10}SiCl_3$, $CH_3(CH_2)_{25}SiCl_3$ or the like, and monochlorosilane-based materials, whose lower alkyl groups are substituted, or dichlorosilane-based surface active materials, such as the following: $CH_3(CH_2)_{18}SiCl_n(CH_3)_{3-n}$, $CH_3(CH_2)_{18}SiCl_n(C_2H_5)_{3-n}$, $CH_3(CH_2)_{15}SiCl_n(CH_3)_{3-n}$, $CH_3(CH_2)_{10}SiCl_n(CH_3)_{3-n}$, $CH_3(CH_2)_{25}SiCl_n(C_2H_5)_{3-n}$ or the like, are included as chlorosilane-based surface active materials containing alkyl groups. $CH_3(CH_2)_nSiCl_3$ (where n represents an integer, preferably between about 3 and 25) is most preferable among these for the dissolution property of the solvent.

In order to achive a high adsorption density, a linear chlorosilane-based surface active material is preferred. However, as said active material applied in this invention, the alkyl fluoride or hydrocarbon groups of the material can be diverged, or the silicons at the ends of the material can be substituted by alkyl fluoride or hydrocarbon groups, expressed as the formulas including $R^2SiCl_2$, $R^3SiCl$, $R^1R^2SiCl_2$ or $R^1R^2R^3SiCl$, where R, $R^1$, $R^2$ and $R^3$ represent alkyl fluoride or hydroxyl groups.

A nonaqueous solvent used for this invention is preferably chosen from the following solvents:

fluoric solvent such as 1,1-dichloro, 1-fluoroethane; 1,1-dichloro, 2,2,2-trifluoroethane; 1,1-dichloro, 2,2,3,3,3-pentafluoropropane; 1,3-dichloro, 1,1,2,2,3-heptafluoropropane or the like;

hydrocarbon-based solvent such as hexane, octane, hexadecane, cyclohexane or the like;

ethers solvent such as dibutylether, dibenzylether or the like;

esters solvent such as methyl acetate, ethyl acetate, isopropyl acetate, amyl acetate or the like.

Acetone, methyl ethyl ketone or the like can be used as ketones solvent.

Metal such as Al, Cu, stainless steel or the like, glass, ceramics, or a group which is hydrophilic but contains a comparatively small number of hydroxyl groups (—OH)— such as a plastic, whose surface is hydrophilic—are included as groups which can be used for this invention.

In employing metal as said group, it is preferable to use a base metal such as Al, Cu or stainless steel since chemical adsorption is promoted between the hydrophilic groups on the substrate surface and chlorosilyl groups in this invention.

If a material, such as plastic, does not have an oxide film on its surface, the surface must become hydrophilic beforehand by introducing to it carboxyl and hydroxyl groups. The introduction of such groups can be directed by treating the surface with 100 W under a plasma atmosphere, containing oxygen, for 20 minutes, or by corona treatment. However, in case of nylon and polyurethane resin, which have imino groups (>NH) on their surfaces, such treatment is not necessary; a dehydrochlorination reaction is promoted between the hydrogens of the imino groups (>NH) of the substrate and the chlorosilyl groups (—SiCi) of a chemical adsorbent, thereby creating a siloxane bond (—SiO—).

This invention can be applicable for various uses and materials as described in the following:

(a) examples of substrates—metal, ceramics, plastic, wood, stone (the invention being applicable even when the substrate surface being coated with paint or the like in advance);

(b) examples of cutlery—kitchen and other knives, scissors, engraver, razor blade, hair clippers, saw, plane, chisel, gimlet, badkin, cutting tools, drill tip, blender blade, juicer blade, flour mill blade, lawn mower blade, punch, straw cutter, stapler, blade for can opener, surgical knife or the like;

(c) examples of needles—acupuncture needle, sewing needle, sewing-machine needle, long thick needle for making tatami, syringe needle, surgical needle, safety pin or the like;

(d) examples of products in the pottery industry—products made of pottery, glass, ceramics or enameled products, including hygienic potteries (such as a chamber pot, wash-bowl, bathtub, etc.), tableware (such as a rice bowl, plate, bowl, teacup, glass, bottle, coffee-pot, pots and pans, earthenware mortar, cup, etc.), flower vases (such as a flower bowl, flowerpot, small flower vase, etc.), water tanks (such as a breeding cistern, aquarium water tank, etc.), chemistry apparatus (such as a beaker, reacter vessel, test tube, flask, culture dish, condenser, stirring rod, stirrer, mortar, vat, syringe), roof tile, tile, enameled tableware, enameled wash bowl, and enameled pots and pans;

(e) examples of mirrors—hand mirror, full-length mirror, bathroom mirror, washroom mirror, mirrors for automobile (back and side mirrors), half mirror, mirror for show window, mirrors for department store or the like;

(f) examples of molding parts—die for press molding, die for cast molding, die for injection molding, die for transfer molding, die for vacuum molding, die for blow forming, die for extrusion molding, die for inflation molding, die for fiber spinning, calender processing roll;

(g) examples of ornaments—watch, jewelry, pearl, sapphire, ruby, emerald, garnet, cat's-eye, diamond, topaz, bloodstone, aquamarine, turquoise, agate, marble, amethyst, cameo, opal, crystal, glass, ring, bracelet, brooch, tiepin, earrings, necklace, glasses frames (of platinum, gold, silver, aluminium, titanium, tin, compound metals of these elements, or stainless steel) or the like;

(h) examples of molds for food—cake mold, cookie mold, bread mold, chocolate mold, jelly mold, ice cream mold, oven plate, ice tray or the like;

(i) examples of cookware—pots and pans, iron pot, kettle, pot, frying pan, hot plate, net for grilling food, tool for draining off oil, plate for making takoyaki or the like;

(j) examples of paper—photogravure paper, water and oil repellent paper, paper for posters, high-quality paper for pamphlets or the like;

(k) examples of resin—polyolefin (such as polypropylene, polyethylene, etc.), polyvinylchloride, polyvinylidenechloride, polyamide, polyimide, polyamideimide, polyester, aromatic polyester, polystyrene, polysulfone, polyethersulfone, polyphenylenesulfide, phenolic resin, furan resin, urea resin, epoxide, polyurethane, silicon resin, ABS resin, methacrylic resin, ethylacrylate resin, ester resin, polyacetal, polyphenyleneoxide or the like;

(1) examples of household electric goods—television, radio, tape recorder, audio goods, CD player, refrigerator, freezer, air conditioner, juicer, blender, blade of an electric fan, lighting equipment, dial plate, hair drier for perm or the like;

(m) examples of sporting goods—skis, fishing rod, pole for pole vault, boat, sailboat, jet skis, surfboard, golf ball, bowling ball, fishing line, fishing net, fishing float or the like;

(n) examples of vehicle parts;
  (1) ABS resin—lamp cover, instrument panel, trimming parts, and protector for a motorcycle,
  (2) cellulose plastic—markings for automobile, and steering wheel,
  (3) FRP (Fiber Reinforced Plastics)—bumper, and engine cover,
  (4) phenolic resin—brake,
  (5) polyacetal—wiper, wiper gear, gas valve, carburetor parts,
  (6) polyamide—radiator fan,
  (7) polyarylate (polycondensation polymerization by bisphenol A and pseudo phthalic acid)—direction indicator lamp (or lens), cowl board lens, relay case,
  (8) polybutylene terephthalate—rear end, front fender,
  (9) poly amino-bismaleimide—engine parts, gear box, wheel, suspension drive system,
  (10) methacrylate resin—lamp cover lens, meter panel and cover, and center mark,
  (11) polypropylene—bumper,
  (12) polyphenylene oxide—radiator grill, wheel cap,
  (13) polyurethane—bumper, fender, instrument panel, and fan,
  (14) unsaturated polyester resin—body, gas tank, heater housing, meter panel, (o) examples of stationary goods—fountain pen, ballpoint pen, mechanical pencil, pencil case, binder, desk, chair, book shelf, rack, telephone base, ruler, draftsman's outfit or the like;

(p) examples of building materials—roof materials (such as ceramic tile, slate, tin such as used in galvanized iron plate, etc.), outer wall materials (such as wood including processed wood, mortar, concrete, ceramic sizing, metallic sizing, brick, building stone, plastic material, metallic material including aluminium, etc.), interior materials (such as wood including processed wood, metallic material including aluminium, plastic material, paper, fiber, etc.) or the like;

(q) examples of stone materials—granite, marble or the like, used for building, building material, works of art, ornament, bath, gravestone, monument, gatepost, stone wall, sidewalk, paving stone, etc.

(r) examples of musical instruments and audio apparatus—percussion instruments, string instruments, keyboard instruments, woodwind instruments, brass instruments or the like, more specifically, drum, cymbals, violin, cello, guitar, koto, piano, flute, clarinet, shakuhachi, horn, etc., and microphone, speaker, earphone or the like.

(s) others—high voltage insulator with good water, oil and contamination-repelling properties, including thermos bottles, vacuum apparatus, insulator for transmitting electricity, spark plugs or the like.

The method of manufacturing a chemically adsorbed film of the invention will now be explained specifically in the following examples 1–3.

EXAMPLE 1

Adsorption solution A was prepared by dissolving 1% by weight of a chemical adsorbent, n-nonadecyl trichlorosilane, into the mixed solvent of hexadecane, carbon tetrachloride and chloroform at a weight ratio of 80:12:8 respectively.

Glass substrate 1, as a hydrophilic group, was prepared as shown in FIG. 1. After being washed with a nonorganic solvent, the substrate was dipped in adsorption solution A for five minutes. Due to this treatment, a dehydrochlorination reaction was promoted between the Si—Cl groups of n-nonadecyl trichlorosilane and the —OH groups of glass substrate 1, thereby forming a chemically adsorbed film on the substrate as shown in formula [1].

Formula [1]

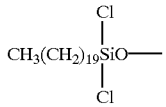

Figure 2:
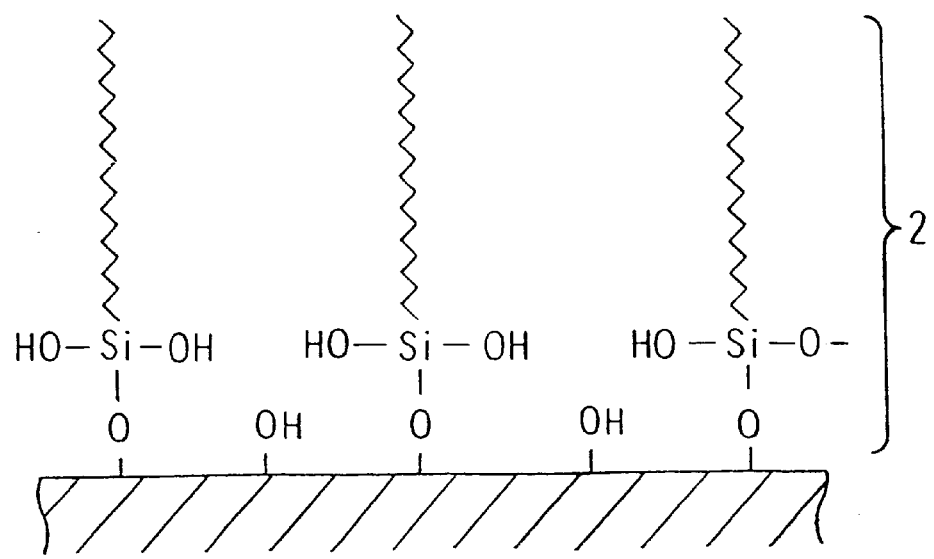
FIG. 2 is a model view, enlarged to a molecular level, showing the chemically adsorbed monomolecular film of the example according to the invention.

A chemically adsorbed monomolecular film 2 as shown in FIG. 2, which had only a few horizontal bonds since the —OH groups were unaffected, was formed after washing the substrate with a nonorganic solvent for 15 minutes and with chloroform for another 15 minutes. This monomolecular film was firmly connected to the substrate, and had excellent water-repelling properties.

The formation of the film was confirmed by obtaining particular signals for this structure at 3680 (reversion: Si—OH), 2930-2840 (reversion: $CH_3$, —$CH_2$—), 1470 (reversion: —$CH_2$—), and 1080 (reversion: Si—O)$cm^{-1}$ by Fourier Transform Infrared Spectral (FTIR) measurement.

Figure 3:
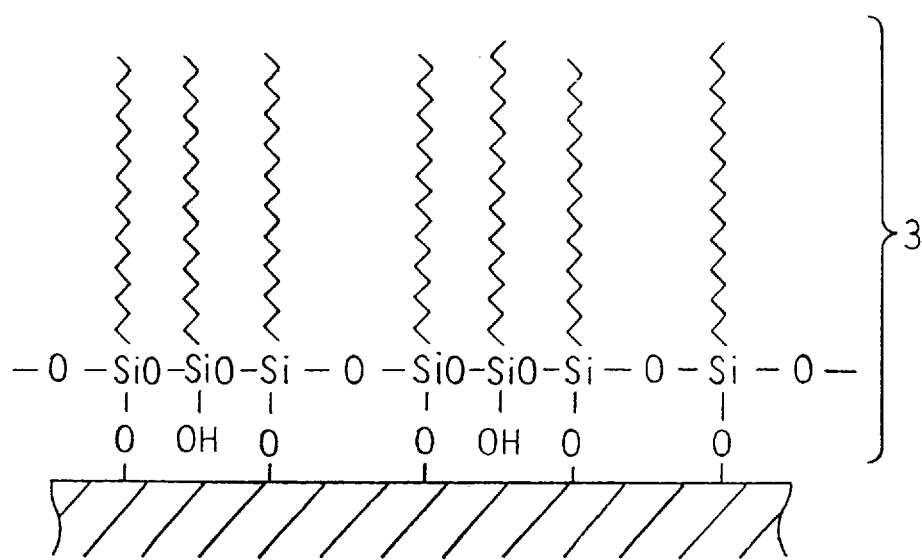
FIG. 3 is a model view, enlarged to a molecular level, showing another chemically adsorbed monomolecular film of the example according to the invention.

As a next step, a readsorption reaction was directed. The substrate with the formed monomolecular film was dipped and held in a newly prepared adsorption solution A for one hour. The substrate was then washed with a nonorganic solvent for 15 minutes and with water for another 15 minutes, thereby promoting a dehydrochlorination reaction between Si—Cl groups of n-nonadecyl trichlorosilane and —OH groups at the root of monomolecular film 3. As a result, a chemically adsorbed film was formed on glass substrate 1 as shown in FIG. 3.

According to FTIR measurement, the particular signals for this structure at 2930-2840 (reversion: $CH_3$, —$CH_2$—), 1470 (reversion: —$CH_2$—), 1080 (reversion: Si—O)$cm^{-1}$ were stronger than the signals obtained after the first reaction. This result confirmed the increase of admolecules. The absorption wave number, measuring the asymmetric stretching vibration of methylene, declined from 2929 $cm^{-1}$ after the first adsorption reaction to 2921 $cm^{-1}$ after the second reaction. It is generally known that such decline in wave number occurs when the distance between molecules with a long chain alkyl part decreases. In fact, the absorption wave number of certain material decreases as the material changes from a gaseous body to a liquid body and then to a solid body. Therefore, confirmation was obtained that the film density increased due to the decrease in distance between the molecules—the composition of the film—after the readsorption reaction.

EXAMPLE 2

Adsorption solution B was prepared by dissolving 1% by weight of a chemical adsorbent, n-nonadecenyl trichlorosilane, into a mixed solvent of hexadecane, carbon tetrachloride and chloroform at a weight ratio of 80:12:8, respectively. As a hydrophilic group, glass substrate 1 was prepared. After being washed with organic solvent, the substrate was dipped and held in adsorption solution B for five minutes. As a result, a dehydrochlorination reaction was promoted between Si—Cl of n-nonadecenyl trichlorosilane and OH of glass substrate 1, thereby forming a chemically adsorbed film on the substrate as shown in formula [2].

Formula [2]

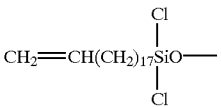

Figure 4:
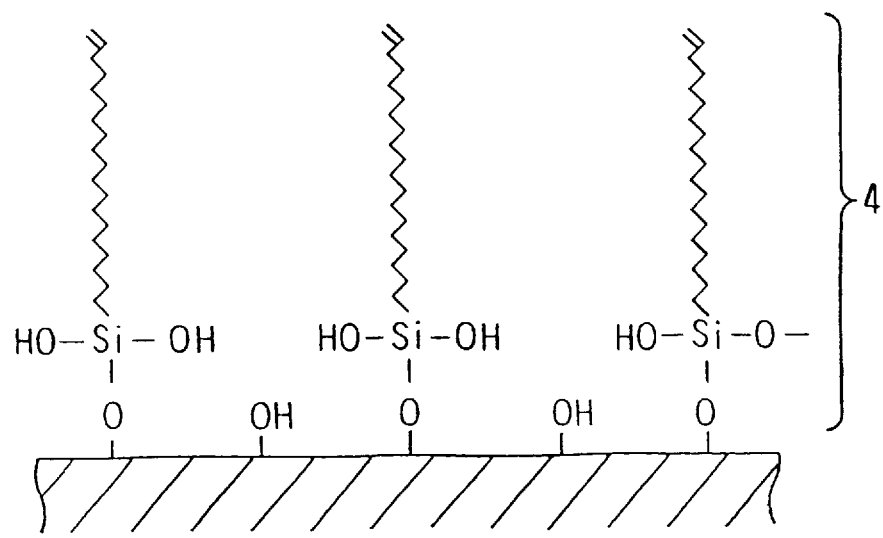
FIG. 4 is a model view, enlarged to a molecular level, showing the chemically adsorbed monomolecular film of another example according to the invention.

After washing the substrate with a nonaqueous solvent for 15 minutes and with chloroform for another 15 minutes, chemically adsorbed monomolecular film 4 as shown in FIG. 4, which had few horizontal bonds since —OH groups were unaffected, was formed. This monomolecular film was firmly connected to the substrate, and possessed good water-repelling properties.

Signals were obtained for this structure at 2930-2840 (reversion: —$CH_2$—), 1470 (reversion: —$CH_2$—), 1080 (reversion: Si—O)$cm^{-1}$ by FTIR measurement, thereby confirming the formation of the film.

A readsorption reaction was directed as in the following procedures:

dipping and holding the substrate formed with the monomolecular film in a newly prepared adsorption solution B;

washing the substrate with a nonaqueous solvent for 15 minutes and with water for another 15 minutes.

Figure 5:
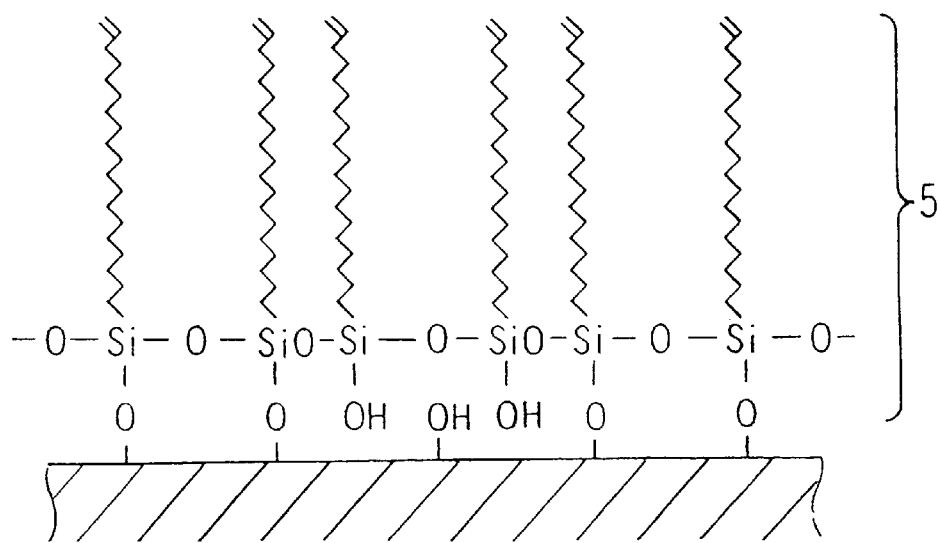
FIG. 5 is a model view, enlarged to a molecular level, showing another chemically adsorbed monomolecular film of the example according to the invention.

A dehydrochlorination reaction was then promoted between Si—Cl of n-nonadecyl trichlorosilane and —OH groups of glass substrate 1, thereby forming a chemically adsorbed film 5 on the substrate as shown in FIG. 5.

The particular signals obtained by FTIR measurement at 2930-2840 (reversion: —$CH_2$—), 1470 (reversion: —$CH_2$—), 1080 (reversion: Si—O)$cm^{-1}$ for this structure were strengthened compared with the signals obtained from the first adsorption reaction, thereby confirming an increase of admolecules. Moreover, the absorption wave number of assymmetric stretching vibration of methylene declined from 2928 $cm^{-1}$ after the first adsorption to 2921 $cm^{-1}$ after the second adsorption.

As in example 1, after the readsorption reaction, the distance between molecules of the film became shorter, and the film density was increased.

EXAMPLE 3

Adsorption solution C was prepared by dissolving 1% by weight of a chemical adsorbent, 14-bromotetradecyl trichlorosilane, into a mixed solvent of hexadecane, carbon tetrachloride and chloroform at a weight ratio of 80:12:8, respectively.

A chemically adsorbed film shown in FIG. 2 was formed through the following procedures as detailed in example 2:

promoting the first adsorption by dipping and holding glass substrate 1 in adsorption solution A;

washing the substrate with a nonaqueous solution, chloroform, and then with water, thereby forming the film. This monomolecular film was firmly fixed to the substrate, and had a good water-repelling property. As in example 1, the formation of the film was confirmed by obtaining particular signals by FTIR measurement.

Readsorption was directed as in the following procedures:

dipping and holding the substrate formed with monomolecular film 2 in a newly prepared adsorption solution C for one hour;

washing the substrate with a nonaqueous solvent for 15 minutes and with chloroform for another 15 minutes.

Figure 6:
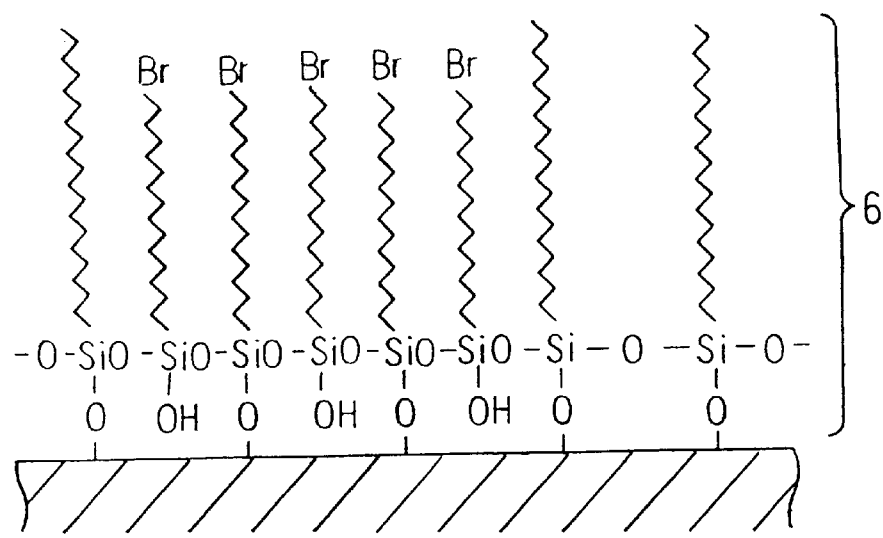
FIG. 6 is a model view, enlarged to a molecular level, showing the chemically adsorbed monomolecular film of another example according to the invention.

As a result, a dehydrochlorination reaction was promoted between Si—Cl of 14-bromotetradecyl trichlorosilane and OH of glass substrate 1 or at the root of monomolecular film 3, thereby forming chemically adsorbed film 6 on the substrate as shown in FIG. 6.

Stronger signals at 2930-2840 (reversion: $CH_3$, —$CH_2$—), 1470 (reversion: —$CH_2$—), 1080 (reversion: Si—O)$cm^{-1}$ were obtained by FTIR measurement after the second adsorption reaction. The creation of an additional particular signal at 1440 (reversion: Br—C)$cm^{-1}$ was also confirmed after the second adsorption. Absorption wave number by the asymmetric stretching vibration of methylene declined from 2928 cm-1 after the first adsorption to 2922 $cm^{-1}$ after the second adsorption. As in other examples, it was confirmed that the distance between the molecules became shorter and the film density was increased.

Although a chemical adsorbent containing halosilyl groups was used for examples 1–3, the same results could be obtained by using an adsorbent having alkoxysilyl groups or the like.

For the first adsorption reaction, a chemical adsorbent comprises a functional group shown in formula [A] or formula [B]. From the second repetition onwards, however, a chemical adsorbent contains at least one group chosen from the group consisting of halosilyl, alkoxysilyl or functional groups shown in formulas [A] through [G].

As explained above, a highly dense chemically adsorbed film is formed by repeating an adsorption reaction and washing process, and by covalently bonding a chemical adsorbent to a substrate and a chemically adsorbed film. The density of the adsorbed film, in addition, can be controlled by varying the time for adsorption reaction, the number of repetitions, and the kind and combination of chemical adsorbents.

The invention may be embodied in other specific forms without departing from the spirit or essential characteristics thereof. The present embodiment is to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A molding part comprising a fluorocarbon-based film formed on a surface of a substrate of said molding part, wherein said substrate surface and said fluorocarbon-based film are bonded with covalent bonds, and wherein said fluorocarbon-based film is produced by reacting a chlorosilane or alkoxysilane with said molding part.

2. The molding part according to claim 1, wherein said covalent bonds are —SiO—.

3. The molding part according to claim 1, wherein said fluorocarbon-based film is $CF_3(CF_2)_nCH_2CH_2Si(—O—)_3$ and wherein n represents an integer between about 3 and 25.

4. The molding part according to claim 1, wherein said fluorocarbon-based film is formed on said substrate surface on an angstrom or nanometer level.

5. The molding part according to claim 1, wherein said fluorocarbon-based film is uniformly formed on said substrate surface.

6. The molding part according to claim 1, wherein based film comprises a monomolecular chemically adsorbed film produced by removing unreacted molecules with a nonaqueous solvent.

7. The molding part according to claim 1, wherein said fluorocarbon-based film comprises a monomolecular chemically adsorbed built-up film which is promoted by bonding graft molecules to stem molecules.

8. The molding part according to claim 1, wherein said molding part is selected from the group consisting of die for press molding, die for cast molding, die for injection molding, die for transfer molding, die for vacuum molding, die for blow forming, die for extrusion molding, die for inflation molding, die for fiber spinning molding and calendar processing roll.

9. The molding part according to claim 1, wherein said fluorocarbon-based film is formed by:

contacting chemical admolecules, containing functional groups as shown in formula [A] or formula [B] at an end of the admolecules, with said substrate surface, wherein the substrate surface has or is given an active hydrogen;

covalently bonding said chemical admolecules to said substrate surface of said molding part by reacting a chlorosilane or alkoxysilane with said molding part;

removing unreacted chemical admolecules with a nonaqueous solution; and reacting said substrate surface of said molding part with water; wherein Formula [A] comprises —AXm where X represents halogen, A represent Si, m represents 2 or 3; further wherein Formula [B] comprises —A(Q)m where Q represents an alkoxyl group, A represents Si, m represents 2 or 3.

10. The molding part according to claim 9, wherein said chemical admolecules are $CF_3(CF_2)_nCH_2CH_2SiCl_3$, wherein n represents an integer between about 3 and 25.

11. The molding part according to claim 9, wherein said condensation reaction is dehydrochlorination or alcohol elimination reaction.

12. The molding part according to claim 9, wherein said unreacted chemical admolecules are removed by a nonaqueous solution.

* * * * *

UNITED STATES PATENT AND TRADEMARK OFFICE
CERTIFICATE OF CORRECTION

PATENT NO.    : 6,593,000 B2
DATED         : July 15, 2003
INVENTOR(S)   : Tadashi Ohtake et al.

It is certified that error appears in the above-identified patent and that said Letters Patent is hereby corrected as shown below:

<u>Column 12,</u>
Line 7, change "based" to -- said fluorocarbon-based --.

Signed and Sealed this

Ninth Day of December, 2003

JAMES E. ROGAN
*Director of the United States Patent and Trademark Office*